J. Wust,
Hoisting Bucket.
No. 658.
Reissued Feb. 8, 1859.
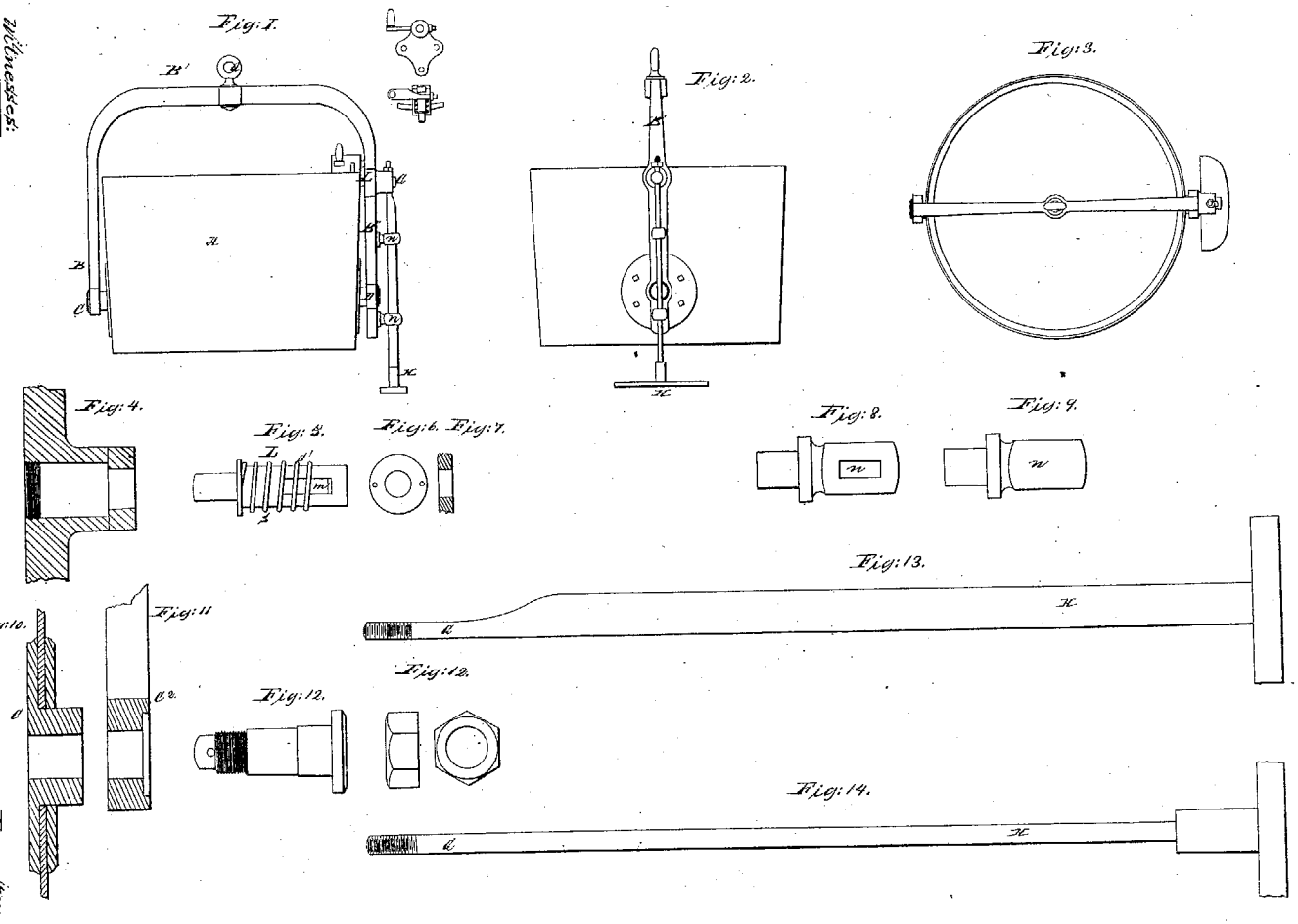
Witnesses:
J. H. B. Jenkins
Wm. C. Grimes
Inventor:
Johann Wust
A.M. PHOTO-LITHO. CO. N.Y. (OSBORNE'S PROCESS)

UNITED STATES PATENT OFFICE.

JOHN WÜST, OF PHILADELPHIA, PENNSYLVANIA.

IMPROVEMENT IN SELF-DUMPING COAL-BUCKETS.

Specification forming part of Letters Patent No. 20,912, dated July 13, 1858; Reissue No. 658, dated February 8, 1859.

*To all whom it may concern:*

Be it known that I, JOHN WÜST, of the city of Philadelphia, and State of Pennsylvania, have invented a new and useful Improvement in the Construction of Dumping Coal-Buckets; and I do hereby declare the following to be a full and exact description of the same, reference being had to the annexed drawings, making a part of this specification, in which—

Figure 1 represents a vertical section of my improved bucket; Fig. 2, a side view; Fig. 3, a top view. Figs. 4, 5, 6, 7, 8, 9, 10, 11, 12, 13, and 14 are views of detached parts, hereinafter referred to.

The object of my improvement is the construction of a self-dumping coal-bucket, to be used in removing coal from one place to another and discharging it at the place of discharge without requiring the aid of an assistant at the place of discharge.

A, Fig. 1, represents an iron coal-bucket, with a handle, B B′ B″, which is attached to the bucket A by pivots at C and D, below the center of gravity of the bucket. *d* is the aperture or hole in the handle to which the hook of the hoisting-tackle is to be attached. G H is a vertical sliding rod which slides through slots at *g* and *k*, fixed on the sides of the handle B B′ B″. A small sliding bolt, L, is attached to the side of the handle B B′ B″. This bolt L is shown in Figs. 5, 6, and 7. It has a slot, M, through which the upper part of the sliding rod G H slides. The upper part of the sliding rod G H is wedge shaped, and when slid up through the slot *m* the bolt L is pushed back from the bucket, and when the sliding rod descends through the slot *m* a spiral spring, *s s′*, which surrounds the bolt, presses the bolt into a small aperture in the upper part of the bucket, and retains it there until the wedge-shaped termination of the rod G H is slid down through the slot *m* and opens the bolt. Figs. 10, 11, and 12 show the pieces by which the pivots secure the handles to the bucket. Figs. 8 and 9 show the slotted pieces *n* and *n′*, through which the vertical sliding rod slides.

The operation of my improved bucket is as follows: The bucket A is first placed with its bottom downward, and, small bolt is slid into the aperture in the top of the bucket. The bucket is thus retained in a vertical position, with its bottom down, until it is filled. The bucket being filled is elevated by the tackle. As it is elevated, the attendant depresses with his foot the sliding rod G H, thereby permitting the spring bolt L to slide in, and at the same time he opens the upper bolt with his hand. The bucket is retained in a proper position with its bottom downward until the lower end of the vertical rod G H touches the pile or surface on which the coal is discharged, and then immediately the rod G H is pushed up and opens the bolt L, and the center of gravity of the bucket being above the points of attachment of the handle B B′ B″ of the bucket at C and D, the bucket tilts over and discharges the coal, and is then elevated bottom upward, and returned to the place for loading the bucket, where the bucket is replaced in its first position, and the same operation is again repeated.

Instead of a sliding rod, a lever with a weight attached, or any equivalent contrivance, may be employed. Thus the bucket is a self-dumping bucket, requiring no attendant at the place of deposit.

Having thus described my improvement, what I claim as my invention, and desire to secure by Letters Patent, is—

The combination of a bucket suspended by the handle at points below its center of gravity, in combination with a self-acting detachable latch operated by the bucket touching the ground.

JOHN WÜRST.

Witnesses:
J. H. B. JENKINS,
SAM. M. FOX.